(12) United States Patent
Doolittle et al.

(10) Patent No.: US 9,297,714 B2
(45) Date of Patent: Mar. 29, 2016

(54) AIR DATA PROBES

(71) Applicant: Rosemount Aerospace Inc., Burnsville, MN (US)

(72) Inventors: Charles Jae Doolittle, Minneapolis, MN (US); Roger Duane Foster, Burnsville, MN (US); Brian Daniel Matheis, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 14/282,629

(22) Filed: May 20, 2014

(65) Prior Publication Data
US 2014/0251001 A1    Sep. 11, 2014

Related U.S. Application Data

(63) Continuation-in-part of application No. 14/183,665, filed on Feb. 19, 2014.

(60) Provisional application No. 61/772,994, filed on Mar. 5, 2013.

(51) Int. Cl.
| | | |
|---|---|---|
| *G01L 7/00* | (2006.01) | |
| *G01L 15/00* | (2006.01) | |
| *G01P 5/165* | (2006.01) | |

(52) U.S. Cl.
CPC ............... *G01L 15/00* (2013.01); *G01P 5/165* (2013.01)

(58) Field of Classification Search
CPC ................................ G01C 7/00; G01C 21/165
USPC ........................................................ 73/178 R
See application file for complete search history.

(56) References Cited

U.S. PATENT DOCUMENTS

| | | | |
|---|---|---|---|
| 4,378,697 A * | 4/1983 | DeLeo et al. | .................... 73/182 |
| 5,313,700 A | 5/1994 | Dorman | |
| 6,547,678 B2 | 4/2003 | Barfield | |
| 7,128,666 B2 | 10/2006 | Veilleux et al. | |
| 7,379,839 B2 * | 5/2008 | Cronin et al. | ................. 702/138 |

FOREIGN PATENT DOCUMENTS

| | | |
|---|---|---|
| EP | 2407671 A1 | 1/2012 |
| GB | 1066935 A | 4/1967 |

(Continued)

OTHER PUBLICATIONS

Extended European Search Report dated Jul. 15, 2015, issued on corresponding European Patent Application No. EP 15168478.4.

*Primary Examiner* — Lisa Caputo
*Assistant Examiner* — Jamel Williams
(74) *Attorney, Agent, or Firm* — Locke Lord LLP; Scott D. Wofsy; Alicia J. Carroll

(57) ABSTRACT

An air data probe includes a probe head and a raised portion. The probe head defines a longitudinal axis and includes a forward tip and a probe head surface. The raised portion is defined in the probe head surface aft of the forward tip. The raised portion is raised radially relative to the probe head surface. The raised portion is configured and adapted to trip a fluid boundary layer passing over the probe head to transition from laminar to turbulent for reducing boundary layer separation for consistent readings at high altitudes and/or high mach numbers. A method of manufacturing an air data probe includes forming a probe head and applying a raised portion to a surface of the probe head aft of the forward tip. Applying the raised portion to the surface of the probe head includes using brazing, additive manufacturing, adhesives and/or any other suitable technique.

14 Claims, 2 Drawing Sheets

(56) References Cited

FOREIGN PATENT DOCUMENTS

| | | | |
|---|---|---|---|
| GB | 1413990 A | 11/1975 | |
| GB | 2490170 A | 10/2012 | |
| JP | 2006009976 A | * | 1/2006 |
| JP | 2006009976 A | 1/2006 | |

* cited by examiner

AIR DATA PROBES

CROSS-REFERENCE TO RELATED APPLICATIONS

This application is a continuation-in-part of U.S. patent application Ser. No. 14/183,665 filed Feb. 19, 2014, which claims benefit to U.S. Provisional Patent Application No. 61/772,994 filed Mar. 5, 2013, each of which are incorporated by reference herein in their entirety.

BACKGROUND OF THE INVENTION

1. Field of the Invention

The present invention relates to air data probes and more particularly to air data probes for aerospace applications.

2. Description of Related Art

A variety of air data probe devices are known in the art for aircraft flight control. Of such devices, many are directed to measuring Pitot pressure, static pressure, local angle of attack pressures, and angle of sideslip pressures as parameters for calculating pressure altitude, altitude rate, airspeed, Mach number, angle of attack, and angle of sideslip. The air data probe typically includes one or more static pressure ports located on the side of the probe head integral to the probe's surface which sense the atmospheric pressure outside of the aircraft. When these static pressure ports take consistent pressure measurements, they can provide accurate and consistent calculations of the above mentioned parameters.

During periods where an air data probe is at a high altitude, angle of attack, and/or Mach number, it is possible for the air data probe to have inconsistent measurement errors in the static ports. There can be considerable variations from one probe to another, suggesting there is a sensitivity to an unknown variable at the conditions described above.

Such conventional methods and systems generally have been considered satisfactory for their intended purpose. However, there is still a need to advance the state of the art by reducing data inconsistencies in air data probes at high altitude, Mach, and/or angle of attack. The present invention provides a solution for these problems.

SUMMARY OF THE INVENTION

An air data probe includes a probe head and a raised portion. The probe head defines a longitudinal axis and includes a forward tip and a probe head surface. The raised portion is defined in the probe head surface aft of the forward tip. The raised portion is raised radially relative to the probe head surface. The raised portion is configured and adapted to trip a fluid boundary layer passing over the probe head to transition from laminar to turbulent for reducing boundary layer separation for consistent readings at high altitudes and/or high mach numbers.

The raised portion is defined proximate the forward tip. The air data probe can include a static port proximate the forward tip. The raised portion can be defined annularly around the probe head axially between the forward tip and the static port. The raised portion can be configured and adapted to trip a fluid boundary layer at low Reynolds numbers on the order of $10^5$, at a speed of approximately Mach 0.9, and/or at a non-zero angle of attack.

The raised portion can include a group of discrete raised portions, can be arranged in a strip defined along the surface of the probe head in an axial direction, and/or can be arranged in a zig-zag pattern. The zig-zag pattern can have a generally constant lengthwise geometric pattern. The raised portion can be arranged in a single strip, or opposing strips, i.e. strips on opposed radii of the probe head. The strip or strips can be defined along a surface of the probe head in an axial direction. The center of strip or strips can be located 90 degrees from the static port. The raised portion can include sharp edged and/or curved transitions between a top surface of the raised portion and a side of the raised portion. The top surface of the raised portion can define a perimeter with a rectangle shape, a square shape, a triangle shape, a circle shape, a cross shape, a star shape, and/or any other suitable shape.

A method of manufacturing an air data probe includes forming a probe head and applying a raised portion to a surface of the probe head aft of the forward tip. Applying the raised portion to the surface of the probe head includes using brazing, additive manufacturing, adhesives, and/or any other suitable technique. These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, exemplary embodiments thereof will be described in detail herein below with reference to certain figures, wherein:

FIG. 2 is a cross-sectional view of a portion of the air data probe of FIG. 1, showing the sharp edges of the raised portion.

FIG. 3 is a cross-sectional view of a portion of another embodiment of an air data probe constructed in accordance with the present invention, showing the raised portion with curved edges;

DETAILED DESCRIPTION OF THE PREFERRED EMBODIMENTS

Figure 1:
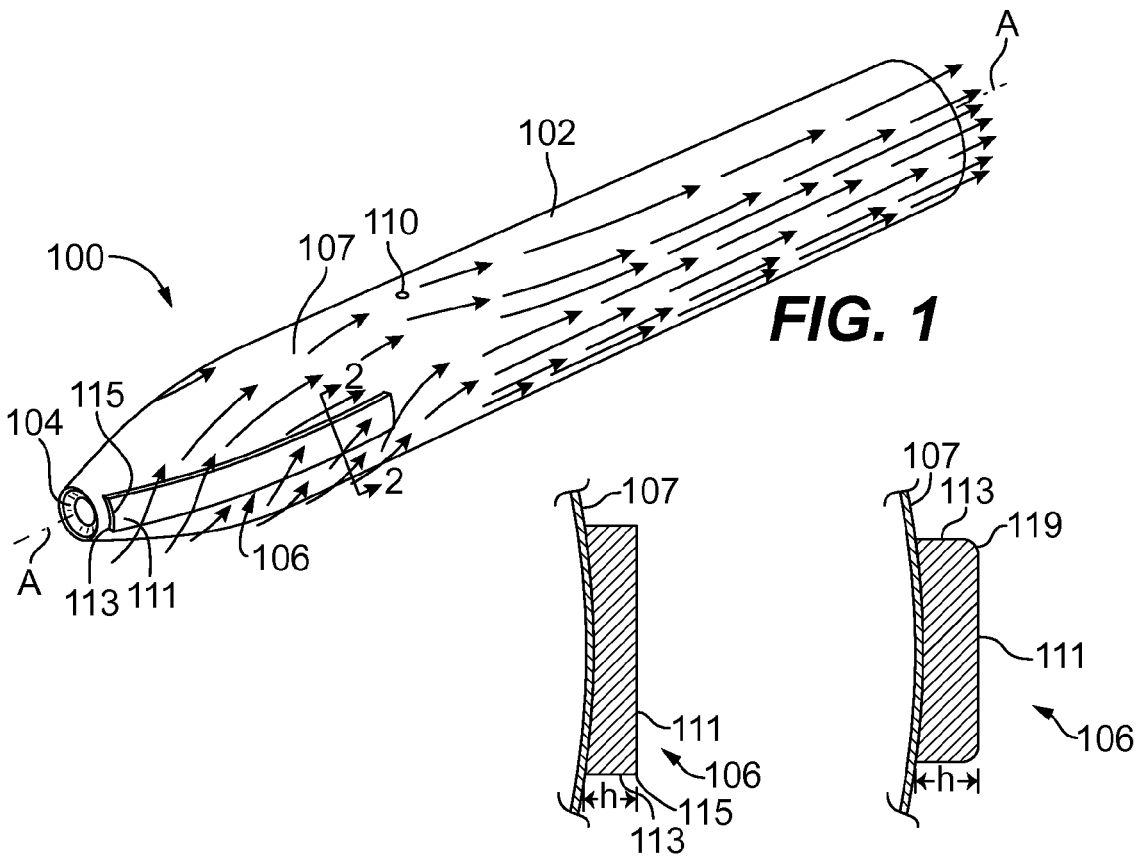
FIG. 1 is a perspective view of an exemplary embodiment of an air data probe constructed in accordance with the present invention, showing a raised portion and a schematic depiction of the air flow over the air data probe.

Reference will now be made to the drawings wherein like reference numerals identify similar structural features or aspects of the subject invention. For purposes of explanation and illustration, and not limitation, a partial view of an exemplary embodiment of an air data probe in accordance with the invention is shown in FIG. 1 and is designated generally by reference character 100. Other embodiments of air data probes in accordance with the invention, or aspects thereof, are provided in FIGS. 2-8 as will be described.

As shown in FIG. 1, an air data probe 100 includes a probe head 102 and a raised portion 106. Probe head 102 defines a longitudinal axis A and includes a forward tip 104 and a probe head surface 107. Air data probe 100 includes a static port 110 proximate forward tip 104. Raised portion 106 is defined in probe head surface 107 aft of forward tip 104 and is raised radially relative to probe head surface 107. Raised portion 106 is configured and adapted to trip a fluid boundary layer passing over probe head 102 to transition from laminar to turbulent for reducing and/or controlling boundary layer separation for consistent readings at low Reynolds number (Re) flight conditions, high altitudes, angle of attack and/or high Mach number. Raised portion 106 is arranged in a strip defined along surface 107 of probe head 102 in an axial direction. In the circumferential direction, the center of raised portion 106 is located 90 degrees from static port 110.

With continued reference to FIG. 1, although raised portion 106 is shown as a single strip, those skilled in the art will readily appreciate that an opposed, e.g. circumferentially opposed, raised portion can be defined along probe head surface 107 on the opposite side from raised portion 106. While air data probe 100 is illustrated with only one static port 110 and one raised portion 106, those skilled in the art will readily appreciate that additional static ports and raised portions can be arranged on probe head 102 in any suitable position for a given application.

With reference now to FIG. 2, raised portion 106 includes sharp edged transitions 115 between a top surface 111 of raised portion 106 and a side 113 of raised portion 106. Those skilled in the art will readily appreciate that raised portion 106 is configured and adapted to trip turbulence in a fluid boundary layer at low Re flight conditions, on the order of $10^5$, and at a speed of approximately Mach 0.9. At angles of side slip and/or angles of attack, these conditions create a cross-flow as depicted schematically by the flow arrows in FIG. 1. The raised portion 106 trips turbulence in the boundary layer of the flow crossing it in these conditions to reduce occurrences of boundary layer separation in the vicinity of static port 110.

As shown in FIG. 3, raised portion 106 optionally includes curved transitions 119 between top surface 111 and side 113. Curved transitions 119 can be in place of sharp edged transitions 115 or in addition to sharp edged transitions 115. It is also contemplated that raised portion 106 can include curved transitions 119 between sides 113 and probe head surface 107, similar to the cross-section having a hump shape 626, described below. Those skilled in the art will readily appreciate that raised portion 106 can also include curved transitions 119 on the forward and aft ends of the strip.

Figure 4:
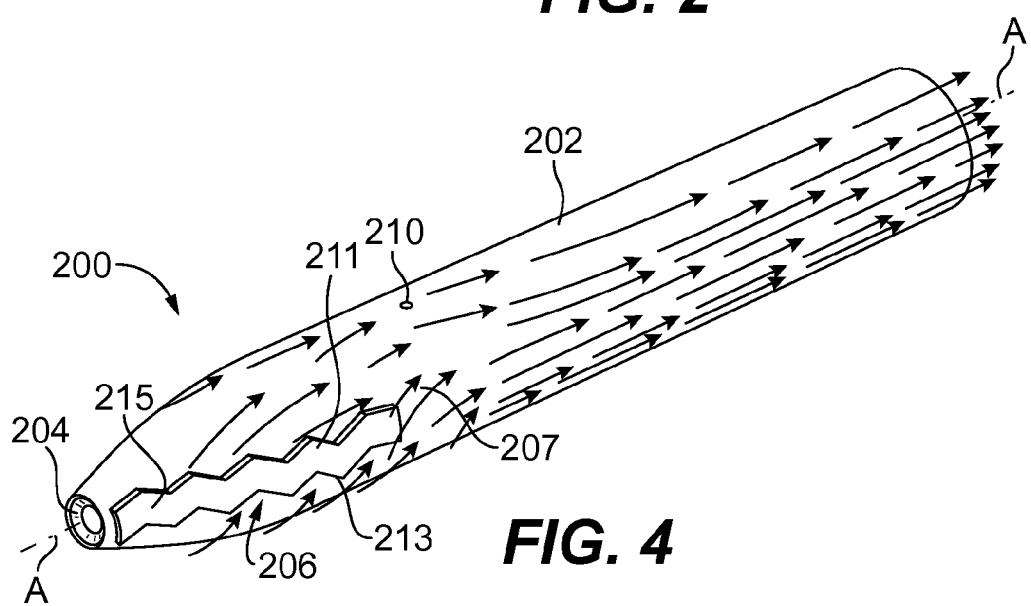
FIG. 4 is a perspective view of another exemplary embodiment of an air data probe constructed in accordance with the present invention, showing a zig-zag raised portion.

Now with reference to FIG. 4, an air data probe 200 includes a probe head 202, a forward tip 204, a static port 210, and a probe head surface 207, and is generally similar air data probe 100, described above. Air data probe 200 includes a raised portion 206 arranged in a zig-zag pattern in an axial direction along probe head 202. Raised portion 206 is similar to raised portion 106, as described above, in that it includes sharp edged transitions 215 and is arranged in an axial direction. Those skilled in the art will readily appreciate that the zig-zag pattern can have a generally constant lengthwise geometric pattern, or any suitable variation thereof for a given application. It is also contemplated that raised portion 206 can be arranged in a zig-zag pattern defined annularly around probe head 202 axially between forward tip 204 and static port 210, similar to the raised portion in FIG. 5, described below. Raised portion 206 is configured and adapted to trip turbulence as described above with respect to raised portion 106. While air data probe 200 is shown with a single static port 210, those skilled in the art will readily appreciate that any suitable number of static ports can be used for a given application.

Figure 5:
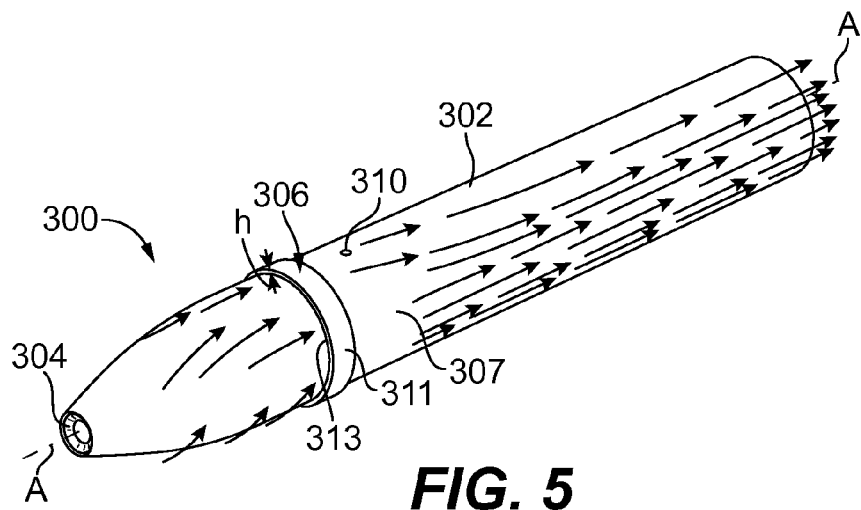
FIG. 5 is a perspective view of another exemplary embodiment of an air data probe constructed in accordance with the present invention, showing a raised portion defined annularly around the probe head.

Now with reference to FIG. 5, air data probe 300 is generally similar to air data probe 100 in that it includes a probe head 302, a forward tip 304, a static port 310, and a probe head surface 307. Air data probe 300 includes a raised portion 306 is defined annularly around probe head 302. Raised portion 306 is defined axially between forward tip 304 and static port 310, respectively. It is contemplated that raised portion 306 can be at any axial position along probe head surface 307. Raised portion 306 is defined in a lateral plane, wherein the lateral plane is perpendicular to longitudinal axis A. Those skilled in the art will readily appreciate that the angle of the plane in which raised portion 306 is defined can vary as suitable for a given application.

With continued reference to FIG. 5, raised portion 306 includes sharp edged transitions 315 between a top surface 311 of raised portion 306 and a side 313 of raised portion 306, similar to raised portion 106, described above. In addition, raised portion 306 has a similar width-wise cross-section to that of raised portion 106. It is contemplated that raised portion 306 can include curved transitions, e.g. curved transitions 119, described above with respect to FIG. 3. Raised portion 306 is configured and adapted to trip turbulence, similar to raised portion 106 described above.

Figure 6:
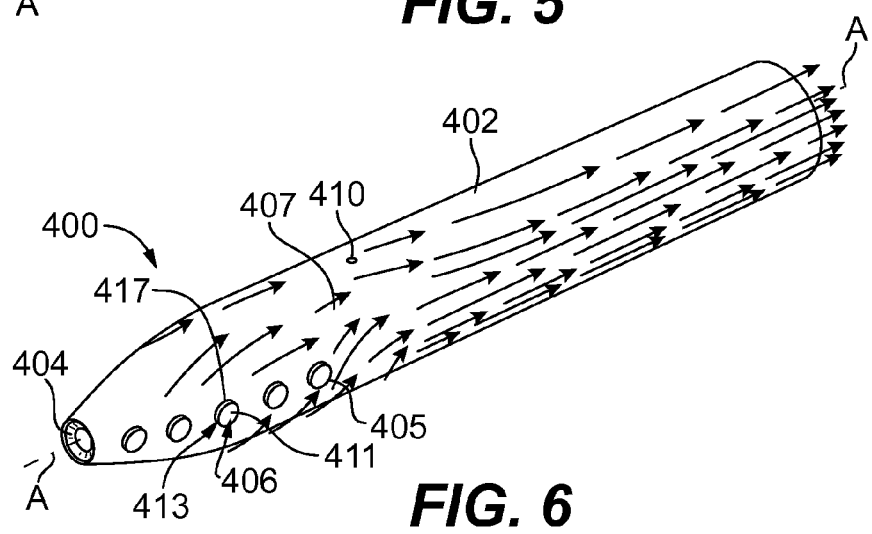
FIG. 6 is a perspective view of another exemplary embodiment of an air data probe constructed in accordance with the present invention, showing a raised portion including a group of discrete raised portions having circular shaped perimeters.

As shown in FIG. 6, air data probe 400 is generally similar to air data probe 100 in that it includes a probe head 402, a forward tip 404, a static port 410, and a probe head surface 407. A raised portion 406 is defined in probe head 402 as a group of discrete raised portions 405 arranged in an axially extending line. A top surface 411 of discrete raised portion 405 defines a perimeter 417 with a circle shape 418. Raised portion 406 is configured and adapted to trip turbulence, similar to raised portion 106 described above. It is contemplated that a raised portion with discrete raised portions can be defined annularly around probe head 402 axially between forward tip 404 and static port 410, respectively, similar to raised portion 306, described above.

Figure 7:
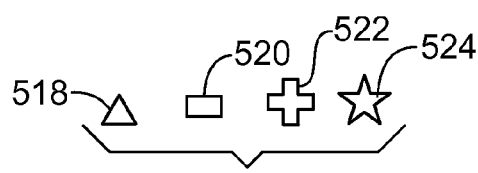
FIG. 7 is a schematic plan view of exemplary embodiments of discrete raised portions constructed in accordance with the present invention, showing the perimeters of the discrete raised portions having a triangle shape, a rectangle shape a cross shape and a star shape.

Now with reference to FIGS. 6 and 7, those skilled in the art will readily appreciate that perimeter 417 of top surface 411 of discrete raised portions 405 can have a variety of different shapes. For example, perimeter 417 can have a triangle shaped perimeter 518, a rectangle shape perimeter 520, a cross shaped perimeter 522, a star shaped perimeter 524, and/or any other suitable perimeter. Those skilled in the art will readily appreciate that a variety of different perimeter shapes can be used depending on what is suitable for a given application. While shown and described in the exemplary context of each discrete varied portion being identical, the size and shape can be varied with the group.

Figure 8:
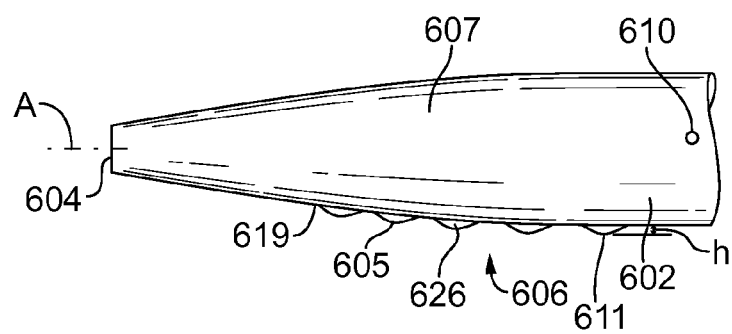
FIG. 8 is an enlarged plan view of a portion of another exemplary embodiment of an air data probe constructed in accordance with the present invention, showing hump shaped discrete raised portions.

As shown in FIG. 8, air data probe 600 is generally similar to air data probe 100 in that it includes a probe head 602, a forward tip 604, a static port 610, and a probe head surface 607. A raised portion 606 is defined in probe head 602 as a group of discrete raised portions 605. Raised portion 606 is configured and adapted to trip turbulence, similar to raised portion 106 described above. Each discrete raised portion 605 includes a cross-section having a hump shape 626. Discrete raised portions 605 include curved transitions 619 between a top surface 611 of hump and surface 607 of probe head. Those skilled in the art will readily appreciate that the other raised portions, e.g. raised portions 206, 306, and 406, can include curved transitions between their top surfaces, e.g. top surfaces 211, 311, and 411 and their sides, e.g. sides 213, 313 and 413, either in place of sharp edged transitions, e.g. sharp edged transition 217, or in addition to the sharp edged transitions. It is also contemplated that the other raised portions can include curved transitions between their sides and the probe head surfaces, e.g. surfaces 107, 207, 307 and 407, of their respective probe heads.

Those skilled in the art will readily appreciate that any raised portion, e.g. raised portions 106, 206, 306, 406 and 606, can be used in conjunction with one or more other raised portions on the same probe head in a variety of suitable arrangements. Those skilled in the art will also readily appreciate that any of the shapes, e.g. shapes 418, 518, 520, 522, 524, 626, can be used together on the same probe head in a variety of suitable arrangements.

Those skilled in the art will readily appreciate that by systematically varying parameters of the raised portion, e.g. raised portions 106, 206, 306, 406 and 606, the features discussed above can be analyzed and optimized for specific applications. For example, the lateral width of the raised portion, axial length of the raised portion, and effective height, h, shown in FIGS. 2 and 3, are three parameters that can be adjusted to tailor performance. Those skilled in the art will readily appreciate that effective height, h, is the radial distance from the probe head surface, e.g. probe head surfaces 107, 207, 307, 407 and 607, to the top surface, e.g. top surfaces 111, 211, 311, 411 and 611, of the raised portion.

With further reference to FIGS. 1-8, as air flows over a probe head, e.g. probe heads 102, 202, 302, 402 and 602, shown schematically from left to right in FIGS. 1, and 4-6, a laminar boundary layer develops along the increasing diameter of the probe head forward tip, e.g. forward tips 104, 204, 304, 404 and 604. Upon reaching a raised portion, e.g. raised portions 106, 206, 306, 406 and 606, the velocity profile of the laminar boundary layer is perturbed, at which time it is expected to transition to a turbulent state. Once a fully developed turbulent boundary layer is formed it continues along the surface of the probe until reaching a static port, e.g. static ports 110, 210 310, 410 and 610. Although shown and described herein with reference to one or two static ports, those skilled in the art will readily appreciate that any suitable number of static ports may be utilized on the probe head.

A method of manufacturing an air data probe, e.g. air data probes 100, 200, 300, 400 and 600, includes forming a probe head, e.g. probe heads 102, 202, 302, 402 and 602, and applying a raised portion, e.g. raised portions 106, 206, 306, 406 and 606, to a surface, e.g. surfaces 107, 207, 307, 407 and 607 of the probe head aft forward tip 104. Those skilled in the art will readily appreciate that applying the raised portion to the surface of the probe head can include using brazing, additive manufacturing, adhesives, or the like. Moreover, raised portions and probe heads of similar or dissimilar materials can be used as needed on an application to application basis. It is also contemplated that a method of manufacturing the air data probe can include forming the probe head and the raised portion from a one-step machining process, for example, the air data probe and the raised portion can be formed by machining a single piece of material.

The methods and systems of the present invention, as described above and shown in the drawings, provide for air data probes with superior properties including reducing and/or controlling boundary layer separation for consistent readings at low Re, e.g. at high altitudes, Mach number, and/or angle of attack. While the apparatus and methods of the subject invention have been shown and described with reference to certain embodiments, those skilled in the art will readily appreciate that changes and/or modifications may be made thereto without departing from the spirit and scope of the subject invention.

What is claimed is:

1. An air data probe comprising:
   a probe head, the probe head defining a longitudinal axis with a forward tip and a probe head surface; and
   a raised portion defined in the probe head surface aft of the forward tip, wherein the raised portion is raised radially relative to the probe head surface, wherein the raised portion is configured and adapted to trip a fluid boundary layer passing over the probe head to transition from laminar to turbulent for reducing boundary layer separation for consistent readings at high altitudes and high mach numbers, wherein the raised portion includes curved transitions between a top surface of the raised portion and a side of the raised portion.

2. An air data probe as recited in claim 1, wherein the raised portion is defined proximate the forward tip.

3. An air data probe as recited in claim 1, further comprising a static port proximate the forward tip, wherein the raised portion is defined annularly around the probe head axially between the forward tip and the static port.

4. An air data probe as recited in claim 1, wherein the raised portion is configured and adapted to trip a fluid boundary layer at low Reynolds numbers on the order of $10^5$.

5. An air data probe as recited in claim 1, wherein the raised portion is configured and adapted to trip a fluid boundary layer at a speed of approximately Mach 0.9.

6. An air data probe as recited in claim 1, wherein the raised portion is configured and adapted to trip a fluid boundary layer at an angle of attack greater than or less than zero degrees.

7. An air data probe as recited in claim 1, wherein the raised portion includes a group of discrete raised portions.

8. An air data probe as recited in claim 1, wherein the raised surface is arranged in a zig-zag pattern, wherein the zig-zag pattern has a generally constant lengthwise geometric pattern.

9. An air data probe as recited in claim 1, wherein the raised portion is arranged in a strip defined along the surface of the probe head in an axial direction.

10. An air data probe as recited in claim 1, wherein the raised portion is arranged in opposing strips each defined along a surface of the probe head in an axial direction.

11. An air data probe as recited in claim 1, wherein the raised portion is arranged in a strip defined along the surface of the probe head in an axial direction, wherein a center of the raised portion is 90 degrees from the static port.

12. An air data probe as recited in claim 1, further comprising sharp edged transitions between a top surface of the raised portion and a side of the raised portion.

13. An air data probe as recited in claim 1, wherein a top surface of the raised portion defines a perimeter with a shape selected from the group consisting of a rectangle, a triangle, a square, a circle, a cross and a star.

14. A method of manufacturing an air data probe, the method comprising:
   forming a probe head, the probe head defining a longitudinal axis with a forward tip and aft base; and
   applying a raised portion to a surface of the probe head aft of the forward tip, wherein applying the raised portion to the surface of the probe head includes using one of brazing, additive manufacturing and adhesives, wherein the raised portion includes curved transitions between a top surface of the raised portion and a side of the raised portion.

* * * * *